United States Patent
Hollander

(10) Patent No.: US 7,897,908 B2
(45) Date of Patent: Mar. 1, 2011

(54) RADIOMETER SIGHTING DEVICE AND METHOD

(75) Inventor: Milton Bernard Hollander, Stamford, CT (US)

(73) Assignee: White Box, Inc., Stamford, CT (US)

( * ) Notice: Subject to any disclaimer, the term of this patent is extended or adjusted under 35 U.S.C. 154(b) by 79 days.

(21) Appl. No.: 12/322,653

(22) Filed: Feb. 5, 2009

(65) Prior Publication Data

US 2009/0147821 A1    Jun. 11, 2009

Related U.S. Application Data

(63) Continuation-in-part of application No. 11/218,103, filed on Sep. 1, 2005, now abandoned, which is a continuation-in-part of application No. 11/088,013, filed on Mar. 23, 2005, now Pat. No. 7,052,175, which is a continuation-in-part of application No. 10/607,088, filed on Jun. 26, 2003, now Pat. No. 6,901,089, which is a continuation-in-part of application No. 09/659,312, filed on Sep. 12, 2000, now Pat. No. 6,614,830, which is a continuation-in-part of application No. 09/605,330, filed on Jun. 27, 2000, now Pat. No. 6,377,400.

(51) Int. Cl.
*G01J 5/00*    (2006.01)

(52) U.S. Cl. .................... 250/214 R; 348/135; 374/130

(58) Field of Classification Search ............ 250/214 R, 250/214.1, 353; 348/135; 374/130
See application file for complete search history.

(56) References Cited

U.S. PATENT DOCUMENTS

| 4,403,251 | A * | 9/1983 | Domarenok et al. | 348/135 |
| 2005/0029459 | A1* | 2/2005 | Gotz et al. | 250/353 |
| 2006/0114966 | A1* | 6/2006 | Kienitz | 374/130 |

\* cited by examiner

*Primary Examiner*—Seung C Sohn
(74) *Attorney, Agent, or Firm*—William A. Drucker

(57) ABSTRACT

A method and device are described for controlling and/or attenuating aiming laser beam brightness in a hand held radiometer. The beam from the laser is directed at a target measurement surface and a transversely movable element member is interposed between the laser and the target to change the beam brightness on the target. In a preferred device a slidable or rotatable element intercepts the beam between the laser and target and a calibrated opening in the element of selected size and/or shape allows part of the beam to pass through the element to provide a safe brightness at the target.

8 Claims, 2 Drawing Sheets

RADIOMETER SIGHTING DEVICE AND METHOD

RELATED APPLICATIONS

This application is a continuation-in-part of application Ser. No. 11/218,103 filed Sep. 1, 2005, now abandoned which is a continuation-in-part of application Ser. No. 11/088,013 filed Mar. 23, 2005 and now U.S. Pat. No. 7,052,175 issued May 30, 2006; which is a continuation-in-part of Ser. No. 10/607,088 filed Jun. 26, 2003 and now U.S. Pat. No. 6,901,089 issued on May 31, 2005; and which is a continuation-in-part of Ser. No. 09/659,312 filed Sep. 12, 2000 and now U.S. Pat. No. 6,614,830 issued on Sep. 2, 2003; which is a continuation-in-part of Ser. No. 09/605,330 filed on Jun. 27, 2000 and now U.S. Pat. No. 6,377,400 and which was issued Apr. 23, 2002. All the above cases are in the name of the same sole inventor and all the cases describe the claimed invention.

FIELD OF THE INVENTION

The present invention relates to the field of measuring, controlling and treatment instruments, such as % for example instruments known as radiometers or pyrometers for measuring the temperature of a surface at a distance, using infra-red measurement techniques.

SCOPE OF THE INVENTION

The invention is directed to a device for management of target identification light beams directed from by a measurement apparatus system, to provide visible indication of a non-visible radiation emitting targeting area to be assessed; and the invention is also directed to a method of indicating a target position and/or size by visible illumination of a radiation emitting zone or area to be measured or controlled.

BACKGROUND OF THE INVENTION

Such instruments, for example, hand-held, battery powered, self-contained pyrometers, utilize a laser-generated beam for the purpose of striking a surface or other target and thereby indicating to the user that the instrument is properly aligned. It is known in the art of laser-aimed instruments to project a single laser beam to create a spot of laser light on the target at a desired central point of the area of the target under investigation or treatment.

The beam should be sufficiently powerful to illuminate the spot on the target so as to be clearly visible to the user of the instrument over a range of distances and under various ambient light conditions. However, it is not possible simply to increase the power of the beam to cope with relatively long distances and bright ambient light conditions. This is because there are legal and practical restrictions on the use of laser beams because of the possible danger to the user, e.g. risk of damage to eyesight. There are regulations and standards which provide different classifications for a product capable of generating a laser beam. There are, in the United States, two laser produce classifications that are used in industry in terms of, for example, infra-red temperature measurement:

1. Class 2: The laser power output of the device at 20 cm away and having a 7 mmperture should be less than 1 mW. Wavelength range: 400 to 700 nano-meters.

2. Class 3A: The laser power output of the device at 20 cm away and having a 7 mm aperture should be less than 5 mW. Wavelength range: 400 to 700 nano-meters.

OBJECTIONS OF THE INVENTION

It is an object of the present invention to provide a laser-aimed instrument, a laser beam aiming, guiding or sighting device for use with an instrument, and an instrument having a laser beam sighting device, which provide for varying the power of the laser sighting beam while still remaining within acceptable limits and providing adequate illumination of the laser beam spot on the target.

It is a further object of the invention to provide such a device, or instrument, whereby the power of the beam generated by the laser beam generator may be higher than would be safe if used alone, or over a range of distances.

It is another object of the invention to provide an improved technique for controlling the power of the laser beam.

SUMMARY OF THE INVENTION

According to the preferred embodiment and best mode of the invention, there is provided laser beam sighting means including a generator generating a laser beam which, in operation, is directed along a path towards a target, and means including at least one calibrated opening which is in said path, said opening being configured, e.g. being sized and/or shaped, to partially obstruct and thereby attenuate the power of said beam when in said path.

Preferably, two or more differently calibrated openings are formed in a movable member, such as a slide or turret, so as to be selectively movable into said path to correspondingly attenuate the power of the beam by different amounts as required.

DETAILED DESCRIPTION OF THE DRAWINGS

Figure 1:
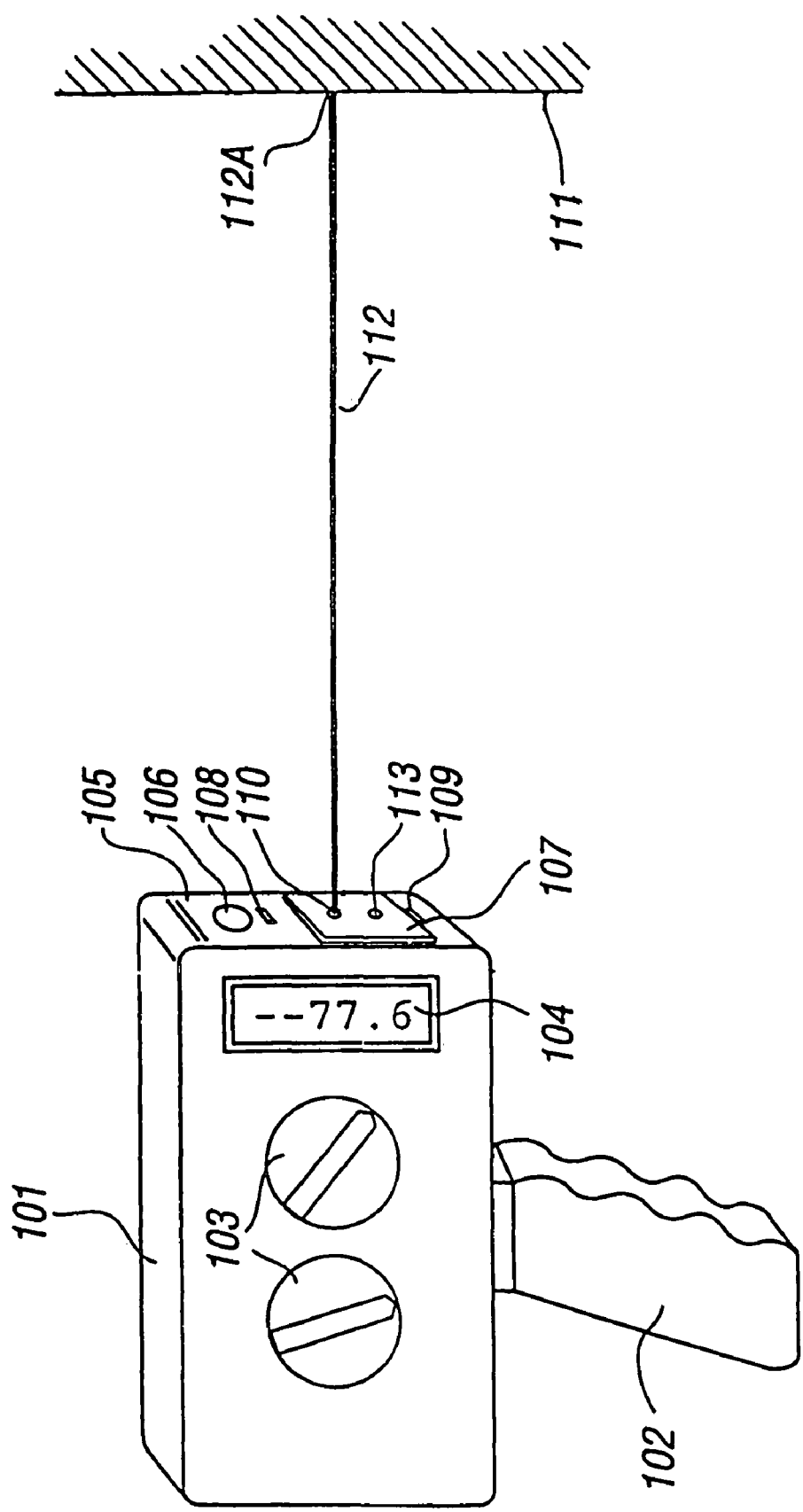
FIG. 1 is a perspective elevation of a measuring instrument, for example, a pyrometer, utilized for measuring, at a distance, the temperature of a selected area of a target.
Figure 2:
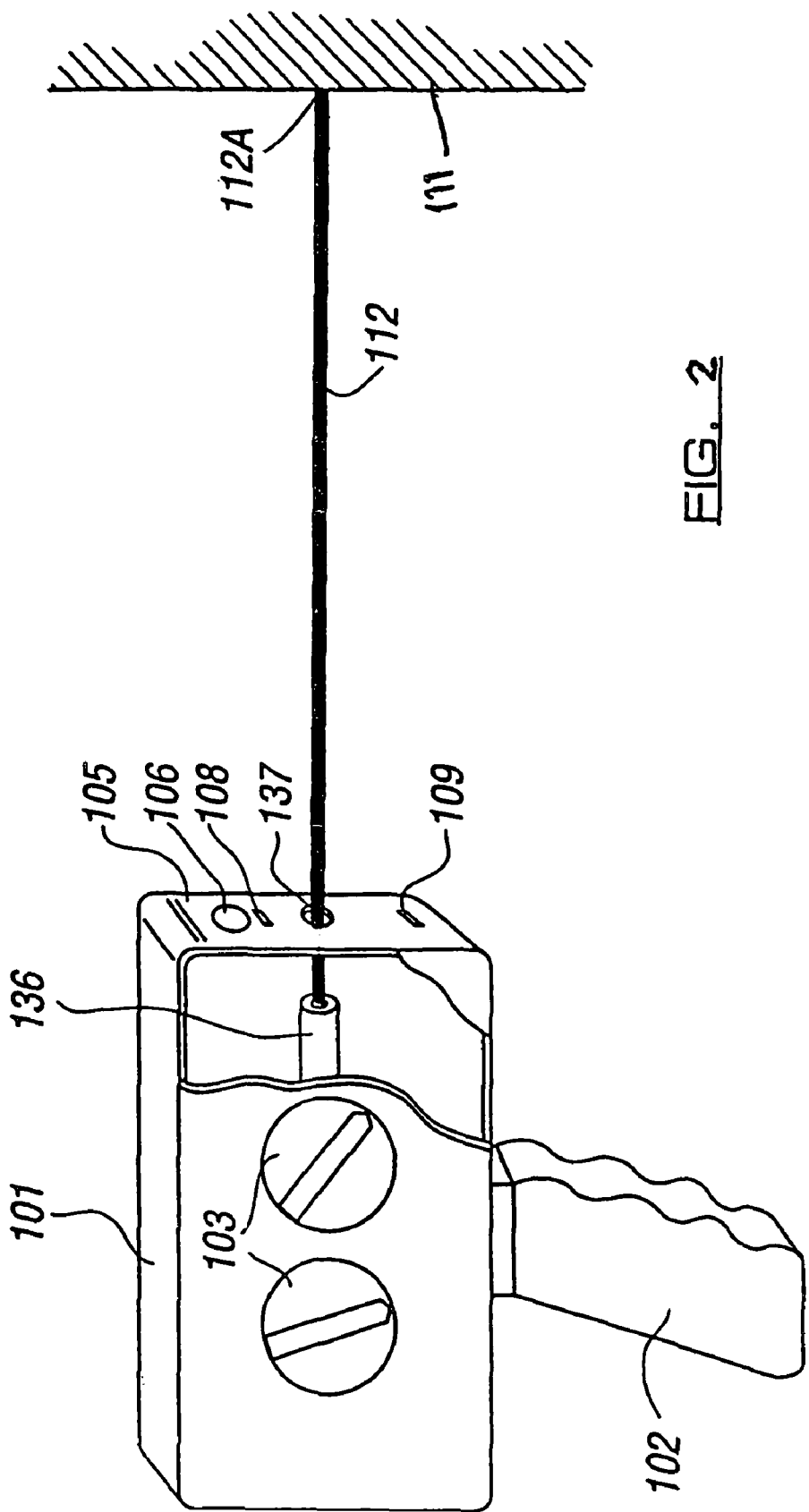
FIG. 2 is a perspective elevation of a measuring instrument, corresponding to that shown in FIG. 1, seen with part omitted and part in section to reveal internal details.

In the drawings there is show an embodiment of this invention in which a temperature measuring instrument (pyrometer) 101 is intended for pointing at a target 111 so as to determine, without contact, at a distance, the temperature of a selected target area. The hand-held, battery powered, self-contained instrument has a handle 102, selector switches 103 for changing ranges of readings, and a digital read-out screen 104 to indicate temperature. This instrument is suitable for single hand operation. At the front end 105 of the instrument housing there is provided a heat-sensitive device 106 which includes means for detecting infra-red radiation from the target area on a heat-sensitive element (not shown) within the instrument. Also on the front end 105 there is provided an outlet 137 for a single laser beam 112 produced by a single laser beam generator or projector 136 located within or upon the instrument housing. The beam is intended to create a spot of laser light on a remote target at a desired central point of the area of the target, the temperature of which is to be measured. Over the outlet 137 there is positioned a slide 107. Stops 108 and 109 on the front end of the housing limit the movement of the slide.

In the slide 107 there is a first calibrated opening or aperture 110 which, when aligned with the beam projector 136, permits a single central beam 112 of a first relatively high power or intensity, to be projected towards the target 111 to strike it at 112A so as to enable a user to aim the pyrometer at the target. Calibration of the aperture is effected by forming the diameter of the aperture to less than the diameter of the beam, so that the edge of the aperture masks the beam and reduces its diameter and therefore attenuates its power by a predetermined amount. In this way, adequate brightness of the associated laser spot is achieved when the beam strikes a target located within a relatively long distance range, whilst the power of the beam at the range is kept within safety limits.

With this power setting, if the instrument were to be aimed at a target located within a relatively short distance range, the safety limits could be exceeded. For this reason, the slide 107 is also provided with a second calibrated opening or aperture 113, smaller in diameter than the aperture 110. When the slide is displaced to align this second aperture 113 with the beam projector 136, the diameter and therefor the power of intensity of the beam 112 is correspondingly reduced so as to remain within safety limits, whilst still providing adequate brightness of the laser spot, when the beam strikes a short range target. One or more further differently calibrated apertures (not shown) may be provided in the slide if required.

In addition to attenuating the beam by means of the calibrated apertures 113, 115 selectively located in the path of the beam, attenuation may also be effected, or fine-tuned, by adjusting the power of the projector 136 itself.

In another embodiment, one of the first or second apertures, or a further aperture, may be configured so as not to attenuate the beam. This aperture may, for example, have the same diameter as the outlet 137. When this aperture is aligned with the outlet, the beam may be projected at full power, or the power may be reduced by reducing the power of the projector 136.

The slide 107 is arranged to be easily movable into register with the outlet 137 by the user of the measuring instrument, say by one finger of a single hand holding the instrument.

In another embodiment, not illustrated, the slide 107 is replaced by a turret can be rotated to selectively position one of the apertures over the laser beam outlet 137.

In a further embodiment, movement of the slid or other movable member provided with the apertures is obtained mechanically or electrically, as distinct from the manual form shown.

A range of different movable members, having differently calibrated apertures, and/or a different number of apertures, may be selected from storage, the apertures being configured to produce different patterns or brightnesses of the beam at the target surface. The movable members may be releasably clipped into position.

There may be circumstances under which it is desirable to change between apertures when aiming at a particular target. In this respect, in a still further embodiment, changing between calibrated apertures is effected automatically on a timed basis, either as a one-off operation, or as a repetitive operation. This will enable the user, when operating the instrument under unfavorable conditions to change over from a relatively high power beam for initially identifying the required location on the target with a relatively bright spot, i.e. for initially correctly aiming the instrument, to a lower power beam when the location of the bright spot has been identified. In a yet further embodiment, the timed basis is made variable at the choice of the user of the instrument.

In a further embodiment, the relative lengths of the timings of the different power beams are different, e.g. short higher power beam operation for initial aiming, followed by a relatively longer lower power beam operation for maintaining aim.

In yet another embodiment, provision is made for spring-loading the movable member or beam-changing means into a rest position, i.e. normally to provide lower beam power operation, but movable when desired so as temporarily to provide higher-beam power operation.

The invention is particularly useful for adjusting the power of the laser beam for different target distances, so as not to exceed safe levels. The invention is also useful for varying the brightness in circumstances where the ambient light on the target would make it difficult, or impossible, to identify laser light spot generated by a lower power beam hitting the target area.

The invention is also useful for modifying, i.e. attenuating, the beam generated by an existing laser beam generator or projector so as to meet safety standards in a particular laser beam sighting application.

In yet another embodiment, the invention is applied to laser beam sighting devices, or instruments incorporating the same, as disclosed in U.S. Pat. Nos. 6,633,434, 6,377,400 and 6,614,830 in the name of Milton B. Hollander, the contents of which are incorporated herein by reference. In this embodiment, in addition to incorporating one or more calibrated apertures to attenuate the power of the laser beam, the movable member comprises a carrier incorporating an aperture fitted with an attenuator such as an adjustable iris, and/or an aperture fitted with a beam splitter such as a diffraction grating or lens.

It will be understood that various modifications may be made without departing from the scope of the present invention. For example, the invention may take the form of an accessory or attachment for an existing laser beam sighting device or instrument incorporating or fitted with such a sighting device.

The invention claimed is:

1. A visible light identification device for measurement of a remote target surface without contact comprising: a light beam source, producing a sighting light beam along a path, and a sighting beam brightness control element mounted on said device, between said source and said target surface, said element being movable into and out of said path to produce a visible light pattern on said surface to identify a measurement area on said target surface.

2. A device according to claim 1 wherein said device cooperates with a sighting beam brightness control element mounted between said source and said measurement surface across the path of said beam for selectable management of beam brightness.

3. A device of claim 2 in which said element includes at least one aperture through which said beam is directed between said source and said target measurement surface.

4. A device of claim 3 in which the size or shape of said aperture is selectable in size and/or shape from amongst separate apertures of said element to control the brightness of a beam passing through said element.

5. A device of claim 2 in which said element is movable across the beam path from said source.

6. A method measuring a feature of a remote surface without contact comprising:
   directing a measurement device to visibly identified illuminated measurement areas of said surface;
   projecting a display of visible light onto said surface to identify said measurement areas; and controlling the brightness of said display by directing said visible light through a brightness control element mounted between said surface and said device.

7. A method according to claim 6 of measuring temperature of a remote surface without contact comprising:

hand directing a radiometer onto a visibly identified illuminated measurement area of said surface;

projecting a sighting display of laser light onto said surface to identify said measurement area; and controlling the brightness of said laser light by hand directing a laser beam from a sighting means of said radiometer onto said surface through a brightness control element mounted on said radiometer between said radiometer and said measurement surface.

8. A method of claim 7 in which said sighting laser beam is directed through an aperture of said control element which is selectable according to size or shape.

* * * * *